United States Patent Office
3,424,441
Patented Jan. 28, 1969

3,424,441
AIR VALVE LIFT CONTROL IN CARBURETTERS
Charles F. Caisley, Watford, and Luigino Mario Finos, London, England, assignors to The Zenith Carburetter Company, Limited, Stanmore, Middlesex, England
Filed June 5, 1967, Ser. No. 643,469
Claims priority, application Great Britain, June 8, 1966, 25,559/66
U.S. Cl. 261—44      10 Claims
Int. Cl. F02m 7/12

ABSTRACT OF THE DISCLOSURE

The air valve of an air valve type carburetter, which is a slide movable transversely of the induction passage and controlled as to its position by differential pressures acting on a movable wall, coupled to it, has one of the said chambers connected both to the induction passage downstream of the air valve and to a source of air at substantially atmospheric pressure, at least one of the connections varying in effective area with the position of the slide.

---

Figure 1:
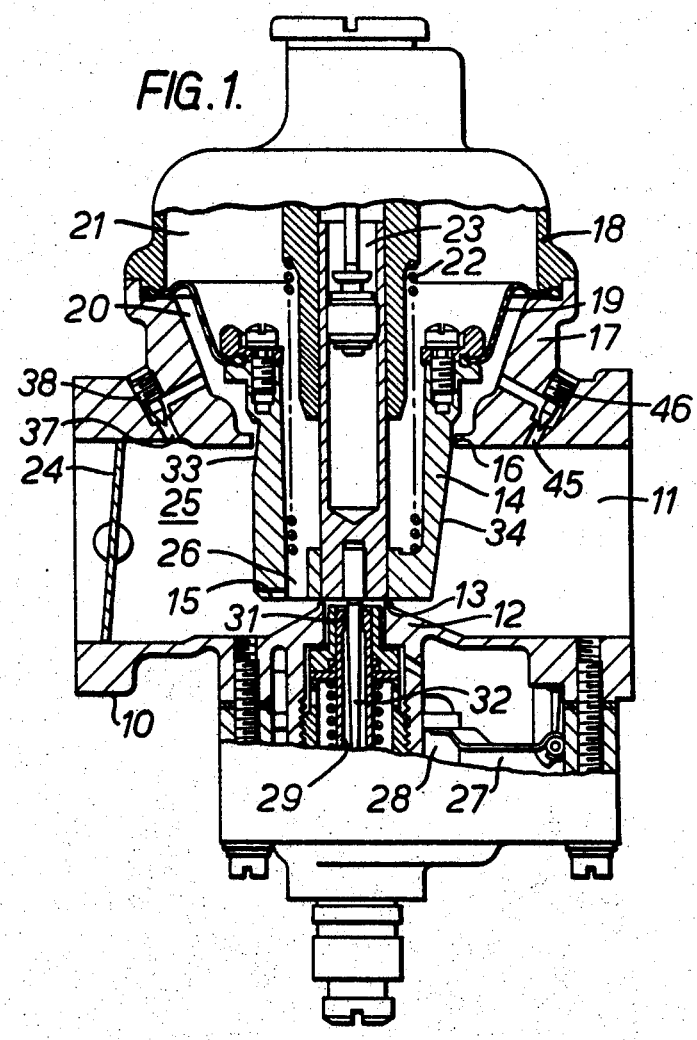

This invention relates to air valve carburetters for supplying fuel/air mixture to internal combustion engines, and more specifically to air valve carburetters in which the air valve comprises a slide movable transversely in the induction passage of the carburetter and having attached to it a piston or diaphragm subjected to an air pressure differential in such a way that the greater the said air pressure differential the greater is the force applied to the slide to move it in a direction to increase the opening of the induction passage.

The piston or diaphragm provides a movable wall separating two chambers one of which is connected to the induction passage downstream of the slide, whilst the other is connected to the atmosphere, so that the depression in the induction passage on the downstream side of the said slide produces a pressure differential across the piston or diaphragm which varies with the said depression and urges the slide outwardly. A restoring force opposing such outward movement is usually provided by the weight of the slide, assisted by a spring.

It is desirable that the slide should reach its position of maximum outward movement at some point in the power range before maximum power is reached, and if the forces acting on the slide are such as to provide maximum outward movement thereof at the desired point, and minimum depression in the induction passage on the downstream side thereof, the outward movement at small throttle openings is too great to provide at such small throttle openings, the depression, and the consequent air velocity past the slide, which is required for satisfactory idling. To provide satisfactory conditions both for idling and for full throttle operation, it is therefore necessary to modify the relation between the forces acting in opposite directions on the slide over some part of its range of movement.

It is the object of the present invention to provide means for effecting such modification of the relation between the said forces.

According to the invention, in an air valve carburetter comprising an air valve constituted by a slide movable transversely in the induction passage of the carburetter and connected to a movable wall separating two chambers and responsive to differential pressure in said chambers produced by the pressure drop created in the induction passage by flow of air past the said slide, one of the said chambers is connected to the induction passage on the downstream side of the slide by a first passage means and to a source of air at substantially atmospheric pressure by a second passage means, at least one of the said first and second passage means having an effective cross-sectional area which varies with the position of the slide.

Both of the said chambers may be connected to the induction passage on the downstream side of the slide so that suction is applied to them when depression exists in the said induction passage, and that one of said chambers in which pressure acts to urge the slide outwardly may be connected to the source of air at substantially atmospheric pressure by passage means the area of which is increased as the slide moves outwardly over at least a part of its range of movement.

The chamber in which air pressure acts to urge the slide outwardly may be connected to the induction passage on the downstream side of the slide by a passage the effective area of which decreases as the slide moves outwardly over at least a part of its range of movement.

In an air valve carburetter according to either of the last two preceding paragraphs, the chamber in which air pressure acts to urge the slide outwardy may be connected to the induction passage on the upstream side of the slide by a passage the effective area of which increases as the slide moves outwardly over at least a part of its range of movement, the said upstream part of the induction passage forming the source of air at substantially atmospheric pressure.

The chamber in which air pressure acts to resist outward movement of the slide may be connected to the induction passage downstream of the slide by means including an orifice so situated and arranged that air flowing in the induction passage produces a less effective extraction of air from the said chamber when the slide is near its inward position than when the slide has moved further outwardly.

Figure 2:
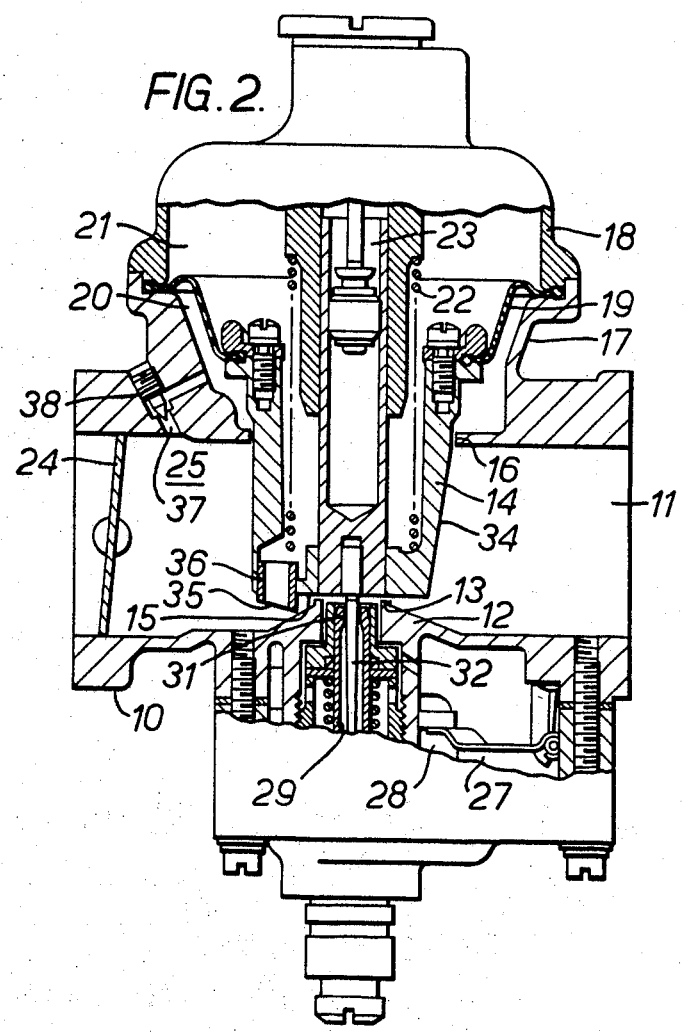
Figure 3:
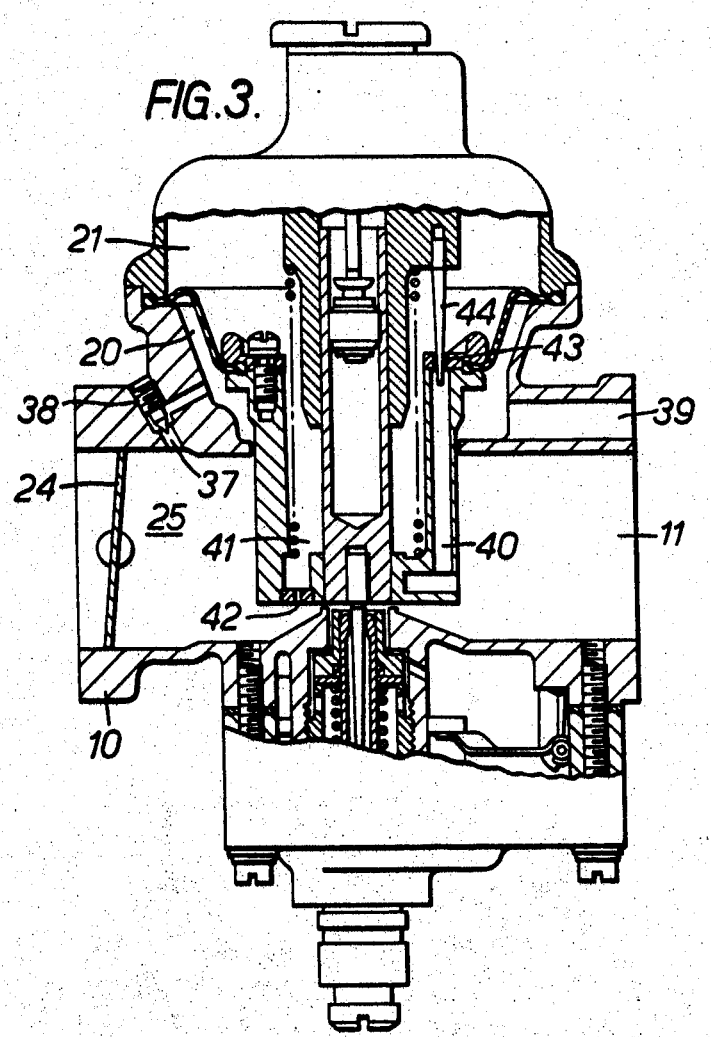

The invention is hereinafter described with reference to the accompanying drawing which shows one form of air valve carburetter embodying the invention, and in which:

FIGURE 1 is a sectional elevation of the carburetter;
FIGURE 2 is a view similar to FIGURE 1 showing a modification; and
FIGURE 3 is another view similar to FIGURE 1 showing a further modification.

Referring to FIGURE 1 of the drawings, the carburetter comprises a body 10 formed with a through passage 11 constituting the induction passage thereof and having intermediate its ends, a bridge 12 providing a flat surface 13, chordal to the passage 11, extending across the said passage. An air valve, constituted by a slide 14 movable transversely of the passage 11, has a flat inner end surface 15 which co-operates with the surface 13 to define a flow passage or throat of variable cross-sectional area. The slide 14 extends through an opening 16 in the wall of the induction passage 11 into a housing formed partly by a wall 17 integral with the carburetter body and partly by a cover 18, a movable wall, constituted by a flexible annular diaphragm 19 clamped at its outer edge between the wall 17 and the cover 18 and clamped at its inner edge to the slide, dividing the said housing into a first chamber 20 adjacent the induction passage 11 and a second chamber 21 remote from the induction passage. A spring 22 urges the slide 14 towards the bridge 12, and a dashpot device 23, of known form, is provided to damp the movements of the slide 14.

A throttle valve 24 conveniently of the conventional butterfly type, is mounted in the induction passage 11 downstream of the slide 14, and the part of the said passage between the slide 14 and the throttle valve 24 is hereinafter referred to as the mixing chamber 25.

The second chamber 21 in the diaphragm housing is connected through an opening 26 in the surface 15 of the slide 14 with the mixing chamber 25.

A fuel chamber 27, to which fuel is supplied by a conventional fuel pump (not shown) through a valve (not shown) controlled by a float 28 in the said chamber communicates through a tube 29 with a jet orifice 31 opening at the surface 13, the effective area of the jet orifice 31 being controlled by a tapered needle 32 carried by the slide 14, so that the said effective area varies with the position of the slide.

The slide 14 is generally cylindrical in cross-section, and the opening 16 is circular, their respective diameters being such as to provide only a small working clearance between them. This clearance provides, on the side of the slide facing the inlet end of the induction passage 11, a passage connecting the chamber 20 to the said inlet end of the induction passage, in which the air is at substantially atmospheric pressure, and also provides, on the side of the slide facing the mixing chamber, a passage connecting the chamber 20 to the mixing chamber. At the side of the slide 14 facing the mixing chamber 25, a flat surface 33 is formed, inclined slightly to the axis of the slide as shown in FIGURE 1, so that, in the position of the slide shown in the drawing, where its surface 15 is close to the bridge, a greater clearance is provided between the slide and the wall of the opening 16 on that side of the slide, this greater clearance decreasing during the first part of the upward movement of the slide and being eliminated when the slide has moved a predetermined distance.

At the opposite side of the slide 14, which faces the inlet end of the induction passage, a second flat surface 34 is formed which is inclined inwardly towards the end of the slide on which the flat surface 15 is formed, and extends to a position such that the clearance between the slide 14 and the wall of the opening 16 begins to increase as soon as the slide moves from its position closest to the bridge and increases progressively as the slide moves to increase the area of the throat.

The clearance between the slide 14 and the wall of the opening 16 will, of course, vary with the actual dimensions of the slide and opening, which will be subject to manufacturing tolerances. To enable a standard rate of flow of air through the throat of the carburetter to be obtained in spite of such variations of clearance, an additional passage 37 is provided to connect the chamber 20 to the mixing chamber 25, and a needle valve 38 in the passage 37 controls its effective cross-sectional area. Another additional passage 45, controlled by a needle valve 46 connects the chamber 20 to the induction passage 11 upstream of the slide. One of the additional passages 37 or 45 may be omitted.

Thus, whilst both chambers 20 and 21 are, at all times when the carburetter is working, subjected to suction due to the depression in the mixing chamber 25, some leakage of atmospheric air will at all times take place into the chamber 20 and the pressure therein will at all times be greater than that in the chamber 21, so as to provide a lifting force on the diaphragm tending to increase the area of the throat. At the position of minimum throat area, when the engine to which the carburetter is attached is idling, the clearance on the mixing chamber side of the slide is a maximum and the clearance on the air inlet side of the slide is a minimum, so that the pressure differential across the diaphragm is a minimum, but as the slide moves to increase the area of the throat, the clearance on the air inlet side increases relative to that on the mixing chamber side so that the pressure differential produced by a given depression in the mixing chamber increases. Therefore, the depression in the mixing chamber which corresponds to the equilibrium of the slide and diaphragm is maximum when the slide is in the position of minimum throat area and progressively decreases as the slide is lifted away from the said position.

Referring now to FIGURE 2 of the drawing, the carburetter therein shown is identical in many respects with that shown in FIGURE 1, and corresponding parts are indicated by corresponding reference numerals. The flat surface 33 described with reference to FIGURE 1 is, however omitted so that only the area of clearance for admission of air to the chamber 20 is varied as the slide moves. To provide a reduction of the pressure differential across the diaphragm 19 produced by a given depression in the mixing chamber at and adjacent the idling position in addition to that provided by restricting the flow of air into the chamber 20, means are provided to reduce the suction applied to the chamber 21. For this purpose, the orifice through which air is drawn from the chamber 21 is so arranged that, when the slide 14 is close to the bridge 12, it is masked to some extent by the said bridge, whereas, when the slide has moved away from the bridge, it is exposed to the stream of air passing through the throat in such a manner that the air flow is fully effective to create suction in the said orifice. As shown in FIGURE 2, the said orifice is provided by the open end 35 of a tube 36 projecting from the surface 15 of the slide, the said end being oblique to the axis of the slide so as to face towards the mixing chamber and being shielded from the direct flow of air through the throat until the slide has moved a short distance away from its position nearest to the bridge.

Referring now to FIGURE 3 of the drawings, the carburetter shown therein is again identical in many respects with that shown in FIGURE 1, corresponding parts being indicated by the same reference numerals. In this arrangement, the chamber 20 is connected to the atmosphere by a passage 39, and communicates with the mixing chamber 25 through the working clearance between the slide 14 and the wall of the orifice 16, which clearance does not vary appreciably with movement of the slide 14. The influence of the said clearance may be set to a standard by providing a passage 37 controlled by a needle valve 38 as described with reference to FIGURE 1. Generally, the passage 39 is sufficiently large to make the influence of the said clearance on the pressure prevailing in the chamber 20 negligible. The chamber 21 is connected to the induction passage 11 upstream of the slide by a passage 40 in the slide and with the mixing chamber 25 through another passage 41 in the slide, the passage 41 opening into the mixing chamber by way of a relatively small orifice 42. The passage 40, at its upper end is reduced in cross-section to provide an orifice 43 through which extends a tapered needle 44 fixed in the cover 18, so that the exective area of the orifice 42 is reduced as the slide 14 rises and increased as the said slide moves downwardly.

Consequently, the relation between the passage area for flow of air into the chamber 21, relative to the passage area for flow of air out of the said chamber decreases as the slide moves outwardly, and a given depression in the mixing chamber 25 results in a greater resultant lifting force on the slide as the latter moves outwardly.

It will be understood that the references ot "pressures" herein include sub-atmospheric pressure, since the pressures in the induction passage downstream of the slide, and in the chamber above the diaphragm, will usually be below atmospheric pressure when the carburetter is working, and the pressure in the chamber below the diaphragm will sometimes be below atmospheric pressure.

The diaphragm may be replaced by a piston slidable in a cylinder.

We claim:

1. An air valve carburetter comprising an air valve constituted by a slide movable transversely in the induction passage of the carburetter and connected to a movable wall separating two chambers and responsive to differential pressures in the said chambers produced by the pressure drop created in the induction passage by flow of air past the said slide, wherein one of the said chambers is connected to the induction passage on the downstream side of the slide by a first passage means and to a source of air at substantially atmospheric pressure by a second passage means, at least one of the said first and second passage means having an effective cross-sectional area which varies with the position of the slide.

2. An air valve carburetter according to claim 1 wherein both of the said chambers are connected to the induction passage on the downstream side of the slide so that suction is applied to them when depression exists in the said induction passage, and that one of said chambers in which pressure acts to urge the slide outwardly is connected to the source of air at substantially atmospheric pressure by passage means the area of which is increased as the slide moves outwardly over at least a part of its range of movement.

3. An air valve carburetter according to claim 1, wherein the chamber in which air pressure acts to urge the slide outwardly is connected to the induction passage on the upstream side of the slide by a passage the effective area of which increases as the slide moves outwardly over at least a part of its range of movement.

4. An air valve carburetter according to claim 1, wherein both of said chambers are connected to the source of air at substantially atmospheric pressure and that one of the said chambers in which pressure acts to urge the slide inwardly is also connected to the induction passage on the downstream side of the slide, the passage means connecting the said last-mentioned chamber to the source of air at substantially atmospheric pressure being so arranged that its effective cross-sectional area is decreased by outward movement of the slide.

5. An air valve carburetter according to claim 4, wherein the effective cross-sectional area of the passage means connecting the chamber in which pressure acts to urge the slide inwardly to the source of air at substantially atmospheric pressure is controlled by a tapered needle extending through an orifice, relative movement of the needle and the orifice being produced by movement of the slide.

6. An air valve carburetter according to claim 1, wherein the chamber in which air pressure acts to urge the slide outwardly is connected to the induction passage on the downstream side fo the slide by a passage the effective area of which decreases as the slide moves outwardly over at least a part of its range of movement, the said upstream part of the induction passage forming the source of air at substantially atmospheric pressure.

7. An air valve carburetter according to claim 6, wherein the said passage or passages is or are provided by so shaping the surface of the slide that the clearance space between the said slide and an opening through which it passes in a wall dividing the induction passage from the chamber in which air pressure acts to urge the slide outwardly changes as the slide moves inwardly or outwardly in the said passage.

8. An air valve carburetter according to claim 1 wherein the chamber in which air pressure acts to resist outward movement of the slide is connected to the induction passage downstream of the slide by means including an orifice so situated and arranged that air flowing in the induction passage produces a less effective extraction of air from the said chamber when the slide is near its inward position than when the slide has moved further outwardly.

9. An air valve carburetter according to claim 8, wherein the said orifice is formed in the end of a tube projecting from the inner end of the slide and so positioned relative to the slide that, when the said slide is near its inward position, the said orifice is shielded from the air flow in the induction passage by a bridge in said passage which co-operates with the slide to define a throat in said induction passage.

10. An air valve carburetter according to claim 9, wherein the orifice is formed by cutting the end of the tube obliquely so that the said orifice faces downstream of the induction passage.

References Cited

UNITED STATES PATENTS

| | | | |
|---|---|---|---|
| 3,243,167 | 3/1966 | Winkler | 261—44 |
| 3,329,413 | 7/1967 | Date | 261—44 X |
| 3,342,463 | 9/1967 | Date et al. | 261—44 |

HARRY B. THORNTON, *Primary Examiner.*

TIM R. MILES, *Assistant Examiner.*

U.S. Cl. X.R.

261—50